(No Model.)
E. O'NEILL.
Stump Extractor.
No. 232,614. Patented Sept. 28, 1880.
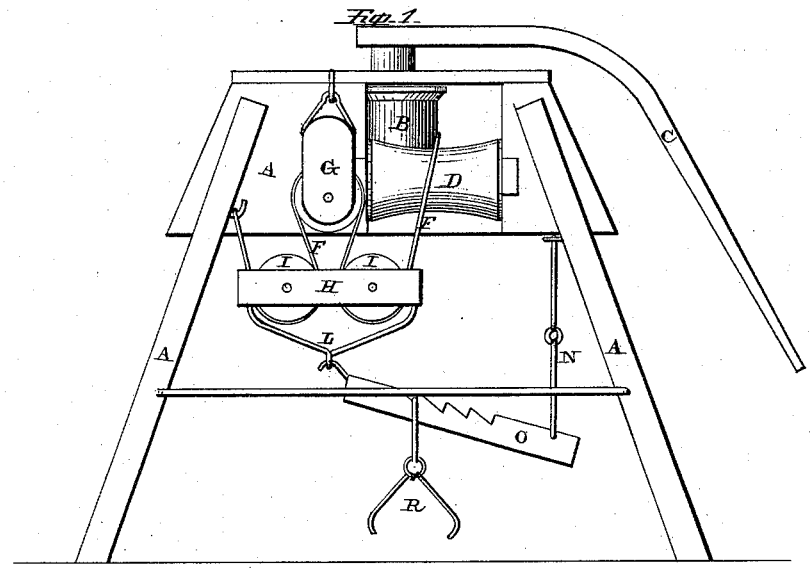
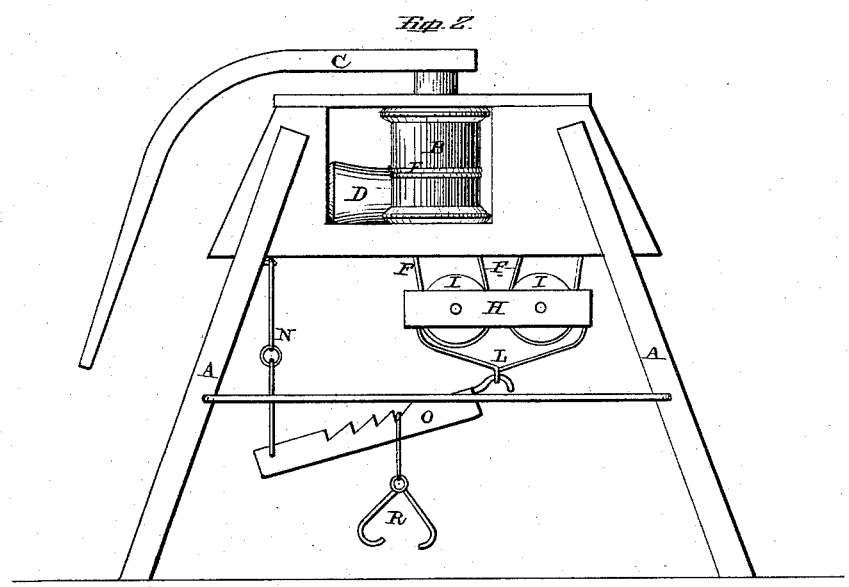
Witnesses
Wm. W. Mortimer
C. H. Isham
Inventor
E. O'Neill,
per
F. A. Lehmann,
Att'y.

UNITED STATES PATENT OFFICE.

EDWARD O'NEILL, OF MITCHELL'S MILLS, PENNSYLVANIA.

STUMP-EXTRACTOR.

SPECIFICATION forming part of Letters Patent No. 232,614, dated September 28, 1880.

Application filed August 20, 1880. (No model.)

*To all whom it may concern:*

Be it known that I, EDWARD O'NEILL, of Mitchell's Mills, in the county of Indiana and State of Pennsylvania, have invented certain new and useful Improvements in Stump-Extractors; and I do hereby declare the following to be a full, clear, and exact description of the invention, such as will enable others skilled in the art to which it pertains to make and use it, reference being had to the accompanying drawings, which form part of this specification.

My invention relates to an improvement in stump-extractors; and it consists in combining with the lever to which the stump is attached and the block and tackle for operating it a sweep, a pulley which is operated by the sweep for winding up the rope, and a pulley for changing the direction of the rope, substantially as described.

The object of my invention is to enable the ordinary lever and its tackle to be operated much more rapidly than has heretofore been done, and at the same time to enable a much greater amount of power to be applied in extracting stumps or roots.

Figure 1 is a side elevation of my invention taken from one side, and Fig. 2 is a similar view taken from the opposite side.

A represents a suitable frame, either of the shape or construction here shown or any other which may be preferred. Journaled in the upper part of this frame, at its center, is the vertical drum B, which has the sweep C attached to its upper end, so that as the horse walks around the machine the elevating-rope will be wrapped directly upon this drum. Journaled upon one side of the frame, at a suitable distance beyond this drum, is the horizontal concave pulley D, over which the elevating-rope F passes, and which pulley serves to change the direction of the rope, as shown. Upon the same side of the frame as that upon which the horizontal pulley is journaled are suspended the pulley and block G, and suspended just below this block and pulley G, by means of the elevating-rope, is the frame H, with its two rollers, I. The elevating-rope, after passing down over the side of the horizontal pulley, passes under one of the pulleys I, then up over the top of the suspended pulley, and then down under the other pulley I, and has its end fastened to the side of the frame A, as shown. The frame H being thus suspended entirely upon the elevating-rope, when the drum is turned so as to either wind the rope upon it or unwind the rope, this frame H will be raised or lowered accordingly. From the under side of this frame H depends a chain or bent rod, L, upon which one end of the lever O is supported. The other end of this lever O is supported by means of the links N, which have their upper ends fastened to the frame. Over the lever, which is provided with suitable notches, are passed the grappling-hooks R, which can be attached either directly to the stump or to the roots, as may be desired. By shifting this grappling back and forth in the notches formed in the upper edge of this lever a greater or less leverage may be obtained, as may be desired, and a longer and shorter pull upon the stump, as may be found necessary.

I am aware that a suspended lever having one end attached to a block and tackle has heretofore been used in extracting stumps; but in all cases a large quantity of rope has been found necessary, and a great many pulleys, and hence but a very slow movement could be obtained. By dispensing with the usual tackle and providing a drum, upon which one end of the rope is wound, as here shown, a very rapid movement is obtained, a much greater power can be exerted by a single horse upon the stump, and a cheaper machine is produced in every way.

Having thus described my invention, I claim—

The combination of a drum having the sweep applied directly to it, a pulley for changing the direction of the rope, a suspended pulley, G, the frame H, provided with the pulleys I, and which is supported entirely upon the operating-rope, the notched lever and the grappling-hooks, the parts being arranged to operate substantially in the manner and for the purpose as shown and described.

In testimony that I claim the foregoing I have hereunto set my hand this 13th day of August, 1880.

EDWARD O'NEILL.

Witnesses:
THEODORE COLEMAN,
DAVID R. LEWIS.